(12) United States Patent
Wan et al.

(10) Patent No.: US 7,114,092 B2
(45) Date of Patent: Sep. 26, 2006

(54) METHOD OF SUPPLYING A REQUIRED CLOCK FREQUENCY BY A CLOCK GENERATOR MODULE THROUGH INTERFACE COMMUNICATION WITH A MAINBOARD

(75) Inventors: Shih-Hao Wan, Chungho (TW); Chung-Yi Lee, Chungho (TW)

(73) Assignee: Adlink Technology Inc., Taipei (TW)

( * ) Notice: Subject to any disclaimer, the term of this patent is extended or adjusted under 35 U.S.C. 154(b) by 448 days.

(21) Appl. No.: 10/678,230

(22) Filed: Oct. 6, 2003

(65) Prior Publication Data
US 2005/0076250 A1    Apr. 7, 2005

(51) Int. Cl.
*G06F 1/04*    (2006.01)

(52) U.S. Cl. .................. 713/501; 713/500; 713/502

(58) Field of Classification Search ............. 713/300, 713/322, 500, 501, 502
See application file for complete search history.

(56) References Cited

U.S. PATENT DOCUMENTS

| | | | |
|---|---|---|---|
| 4,812,733 A * | 3/1989 | Tobey | 323/285 |
| 5,454,725 A * | 10/1995 | Speiser et al. | 439/61 |
| 5,798,961 A * | 8/1998 | Heyden et al. | 365/52 |
| 6,006,327 A * | 12/1999 | Chang et al. | 713/1 |
| 6,055,600 A * | 4/2000 | Nguyen et al. | 711/100 |
| 6,128,744 A * | 10/2000 | Wang | 713/300 |
| 6,199,185 B1 * | 3/2001 | Ju et al. | 714/744 |
| 6,370,318 B1 * | 4/2002 | Iwaki | 386/94 |
| 6,581,124 B1 * | 6/2003 | Anand | 710/305 |
| 2003/0126483 A1 * | 7/2003 | Huang et al. | 713/310 |
| 2003/0169055 A1 * | 9/2003 | Klement | 324/652 |
| 2003/0201838 A1 * | 10/2003 | Tam et al. | 331/74 |
| 2004/0150383 A1 * | 8/2004 | Blais | 324/73.1 |

* cited by examiner

*Primary Examiner*—Malcolm Cribbs
(74) *Attorney, Agent, or Firm*—Rabin & Berdo, P.C.

(57) ABSTRACT

A clock generator module is disclosed. A clock generator module, electrically connected with a mainboard through a connector for communicating with each other, wherein an interface definition of the clock generator communicates with a control logic circuit of the mainboard to generate a required clock frequency.

9 Claims, 3 Drawing Sheets

METHOD OF SUPPLYING A REQUIRED CLOCK FREQUENCY BY A CLOCK GENERATOR MODULE THROUGH INTERFACE COMMUNICATION WITH A MAINBOARD

BACKGROUND OF THE INVENTION

1. The Field of the Invention

The present invention relates to a clock generator module, and more particularly relates to a modular clock generator circuit providing various clock frequencies required. Thus, one particular electronic product is extendable for satisfying various frequencies requirements without incurring high cost on product design, and manufacturing and product management.

2. Description of the Related Art

The available measuring devices, data acquisition device or equipment, comprise a clock generator circuit for either analog input/output functions or digital input/output functions to achieve various functionalities. The clock in an analog input/output circuit is used for providing a sampling or updating clock to an analog-to-digital converter or a digital-to-analog converter integrated circuit. And to use the clock signal in the digital input/output circuit is for digital signal sampling or renewing The clock circuit is designed so as to allow selection of various frequencies by a user for enjoying or achieving various appliance features, or allowing to achieving various frequencies setup. Some methods of generating clock signal are described as follows.

(a) A time base clock signal generated from an oscillator is transmitted to a frequency divider circuit of a logic circuit to achieve various frequency setup. This method of setting up various frequency results in a poor frequency resolution, but however the manufacturing cost thereof is very low. Further, the functionality of the oscillation is limited to a certain range and is also of accuracy concern. For example, a time base clock signal frequency of 100 MHz, when divided by 2 results into 50 MHz; when divided by 3 results into 33.33 MHz; when divided by 4 results into 25 MHz; when divided by 5 results into 20 MHz; when divided by 6 results into 16.66 MHz, and so on, but however a frequency value between 50 MHz and 100 MHz, for example, a 75 MHz cannot be achieved by the above oscillator.

(b) A DDS (direct digital synthesizer) IC is capable of providing frequency adjustment with high resolution, wherein the adjustable frequency resolution to a degree of μ Hz, and therefore the resulting frequency can be very exquisite. The advantage of this method is the high frequency resolution, for example, are 211.354677 KHz, 301.3445 MHz and other fine adjustment range. But the disadvantage is the high manufacturing cost and the highly complicated manufacturing process for producing a DDS IC. Additionally, the vibration levels are related to the DDS IC.

(c) Use PLL (phase lock loop) technology to generate the clock signal. The PLL locks up the clock signal at a certain frequency and result in an absolute accuracy, however generally speaking, the clock resolution is poorer and the clock vibration levels are related to the PLL IC as well.

The above three methods of generating clock signal have some advantages as well some disadvantages. If an user needs all the three types of clock generators, the user needs to purchase three measuring devices with different types of clock generators, and accordingly, the product management, the cost of design and the production would be expensive.

Therefore, a clock generator module suitable for applying in various circuit board and electronic products without incurring high cost is highly desirable.

SUMMARY OF THE INVENTION

Accordingly, in the view of the foregoing, the present inventor makes a detailed study of related art to evaluate and consider, and uses years of accumulated experience in this field, and through several experiments, to create a new and most suitable clock generator module. The present invention provides an innovated cost effective clock generator module suitable for various circuit boards and electronic products.

According to an aspect of the present invention, the clock generator module is electrically connected with a mainboard through a connector for communicating with each other, wherein the clock generator module communicates with a control logic circuit on the mainboard to generate a required clock frequency. Accordingly, based on the various appliances, a most suitable clock generator module is provided for supplying multiple clock frequency functionality. Thus, the clock generator module of the present invention satisfies every kind of appliance of clock requirements incurring less product management, low manufacture and design cost.

BRIEF DESCRIPTION OF THE DRAWING

For a more complete understanding of the present invention, reference will now be made to the following detailed description of preferred embodiments taken in conjunction with the accompanying drawings, in which.

DETAILED DESCRIPTION OF PREFERRED EMBODIMENTS

Figure 1:
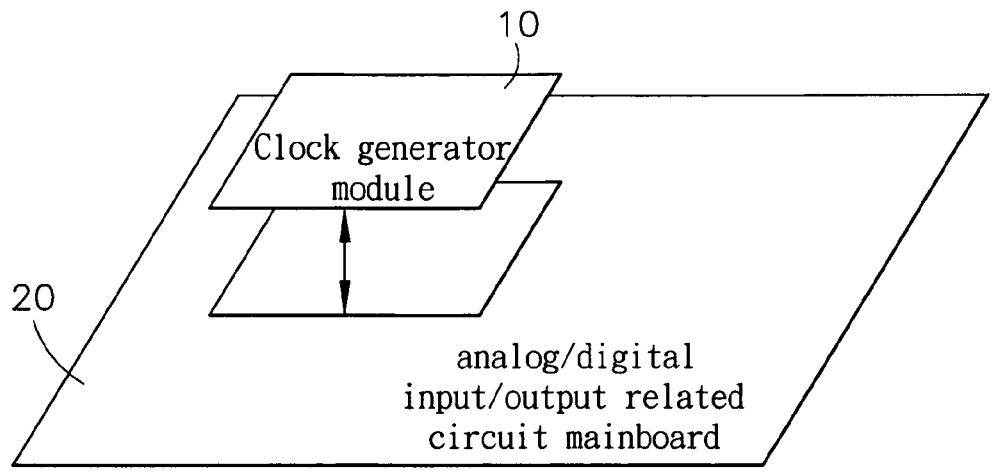
FIG. 1 is a block diagram illustrating the link between the clock generator module and mainboard according a preferred embodiment of the present invention.

Reference will be made in detail to the preferred embodiments of the invention, examples of which are illustrated in the accompanying drawings. Wherever possible, the same reference numbers are used in the drawings and the description to refer to the same or like parts.

Referring to FIG. 1, is a block diagram illustrating a linking between the clock generator module and mainboard according to one preferred embodiment of the present invention. As shown in FIG. 1, the clock generator module 10 and the mainboard 20 having an analog or a digital input/output related circuit are electrically connected through a board-to-board connector or a connection wire for communicating with each other through mutual signal transmission. Thus, each related circuit of the mainboard 20 can get the clock frequency in various specifications.

Figure 2:
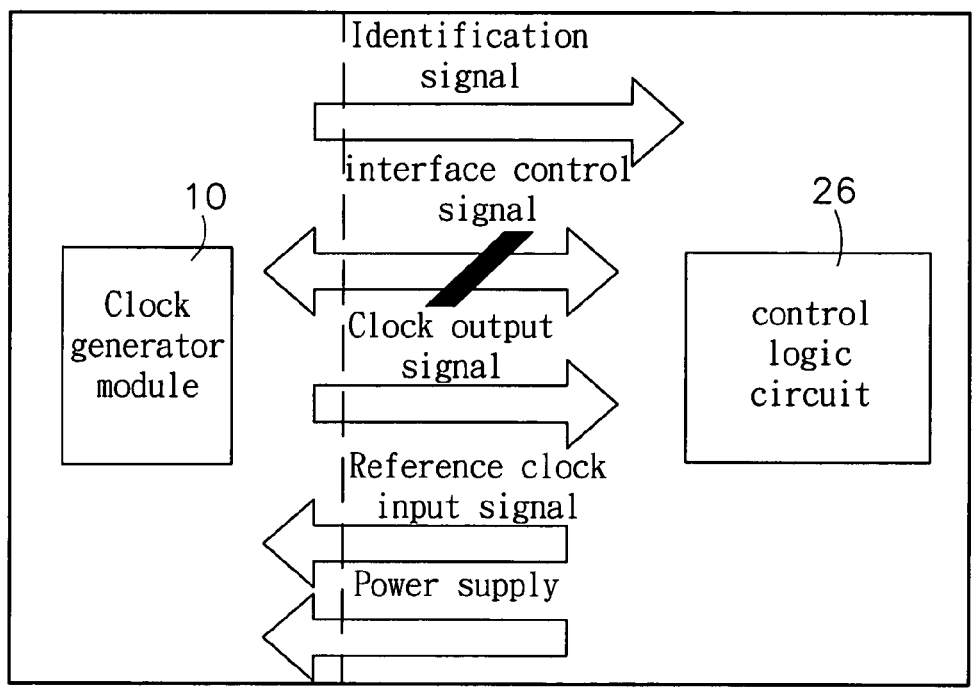
FIG. 2 is a block diagram illustrating the main logic interface definition of the clock generator module of the present invention.

Referring to FIGS. 1 and 2, respectively illustrate the link between the clock generator module 10 and mainboard 20, and a block diagram of the interface definition of the clock generator module of the present invention. The control logic circuit 26 of the mainboard 20 and the clock generator module 10 mutually transmit signals to each other, regardless of the method with which the clock is generated, the control logic circuit 26 of the mainboard 20 is able to identify the method of generating clock, then decides to use various signal control protocol to setup the various frequency for the clock generator module 10. The user can use software to command the clock generator module 10 through the control logic circuit 26 for setting up the frequency. The control logic circuit 26 can monitor the status of the clock generator module 10 over the interface between them. In order to identify the type of module, the interface of the clock generator module 10 has to be defined. The interface definition of the clock generator module 10 comprises identification signals, interface control signals, a reference clock input signal, a clock output signal and a power supply.

Nevertheless, the above identification signals can be designed to function in a three-bit identification mode. This three-bit identification mode enables to identify eight types of clock generator modules, wherein different clock generator module will differentiate the functions based on the digital level of the three-bit identification mode. Additionally, the interface control signals use ten signals, and taking DDS IC as an example, comprising at least an enabling signal, a serial clock signal, a serial data input signal, a reset signal, a renew signal and an error report signal.

Furthermore, the control logic circuit 26 generates the interface control signals to set various clock generator module according to retrieved three-digit identification information. And the reference clock input signal can be used when the clock generator module needs a clock reference input from the mainboard, for ex, the PLL reference clock. The clock module output signal is the required clock signal outputs to the mainboard 20. The power supply for the clock generator module 10 is supplied by the mainboard 20 to maintain the operation.

Figure 3:
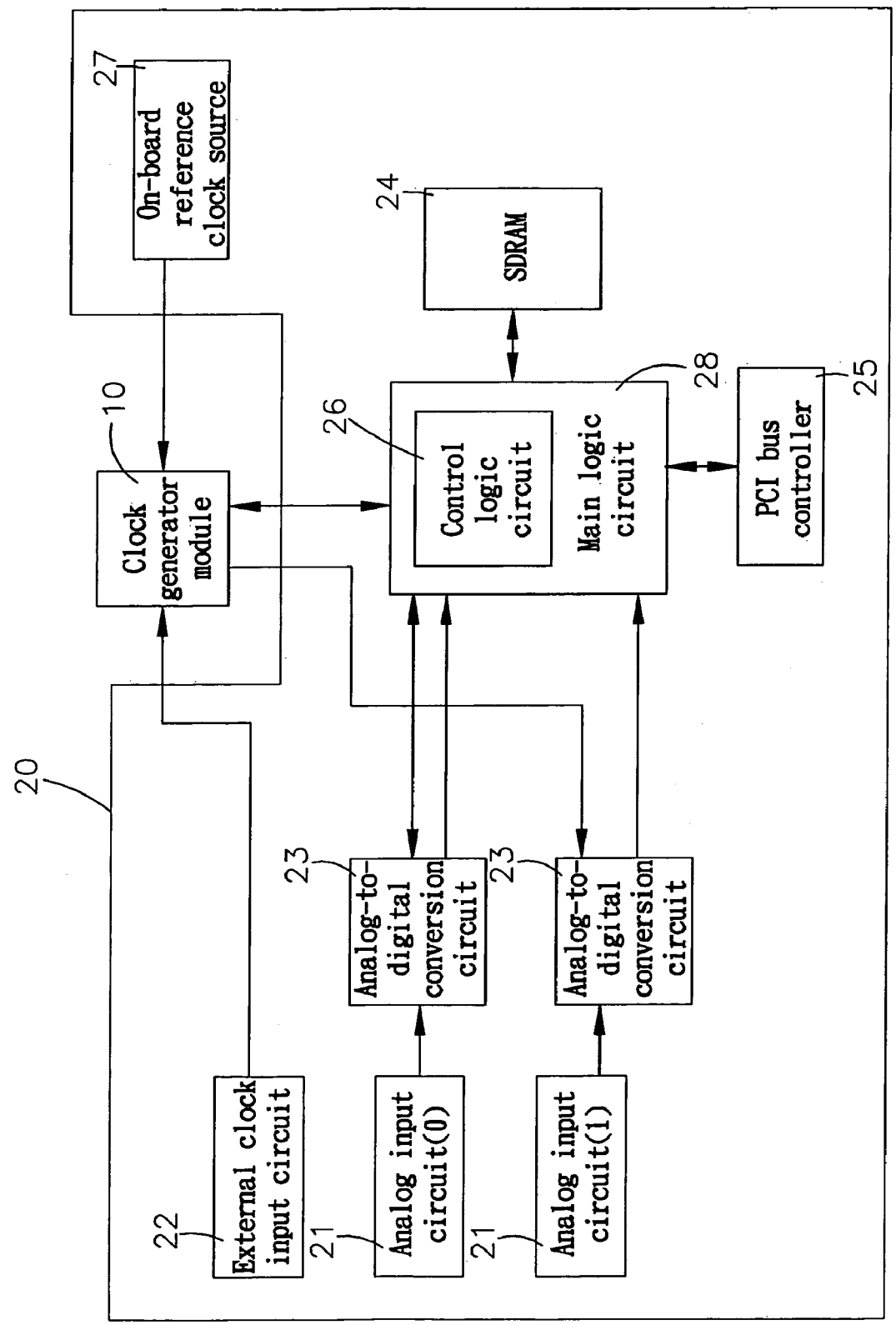
FIG. 3 is a flowchart showing the application of the clock generator module of the present invention in the analog-to-digital conversion equipment.

Referring to FIG. 3, the flowchart illustrating the application of the clock generator module of the present invention in the analog-to-digital conversion equipment. The control logic circuit 26 is capable of setting up the required clock output frequency of the clock generator module according to different signal control protocol for various clock generator module 10. The analog-to-digital conversion equipment has two analog input circuits 21 to convert the analog signal into digital signal through the analog-to-digital conversion circuit 23, and the required sampling clock for the analog-to-digital conversion circuit is generated by the clock generator module 10. The reference clock input of the clock generator module 10 can be selected to be from the external clock input contact 22, on-board reference clock source 27, or the reference clock generated by the clock generator module 10 itself. The digital data generated after the conversion will be stored into the SDRAM 24 by the main logic circuit 28. When the analog-to-digital conversion is accomplished, the main logic circuit 28 takes control of transmitting the data back to the computer through the PCI bus controller 25.

Figure 4:
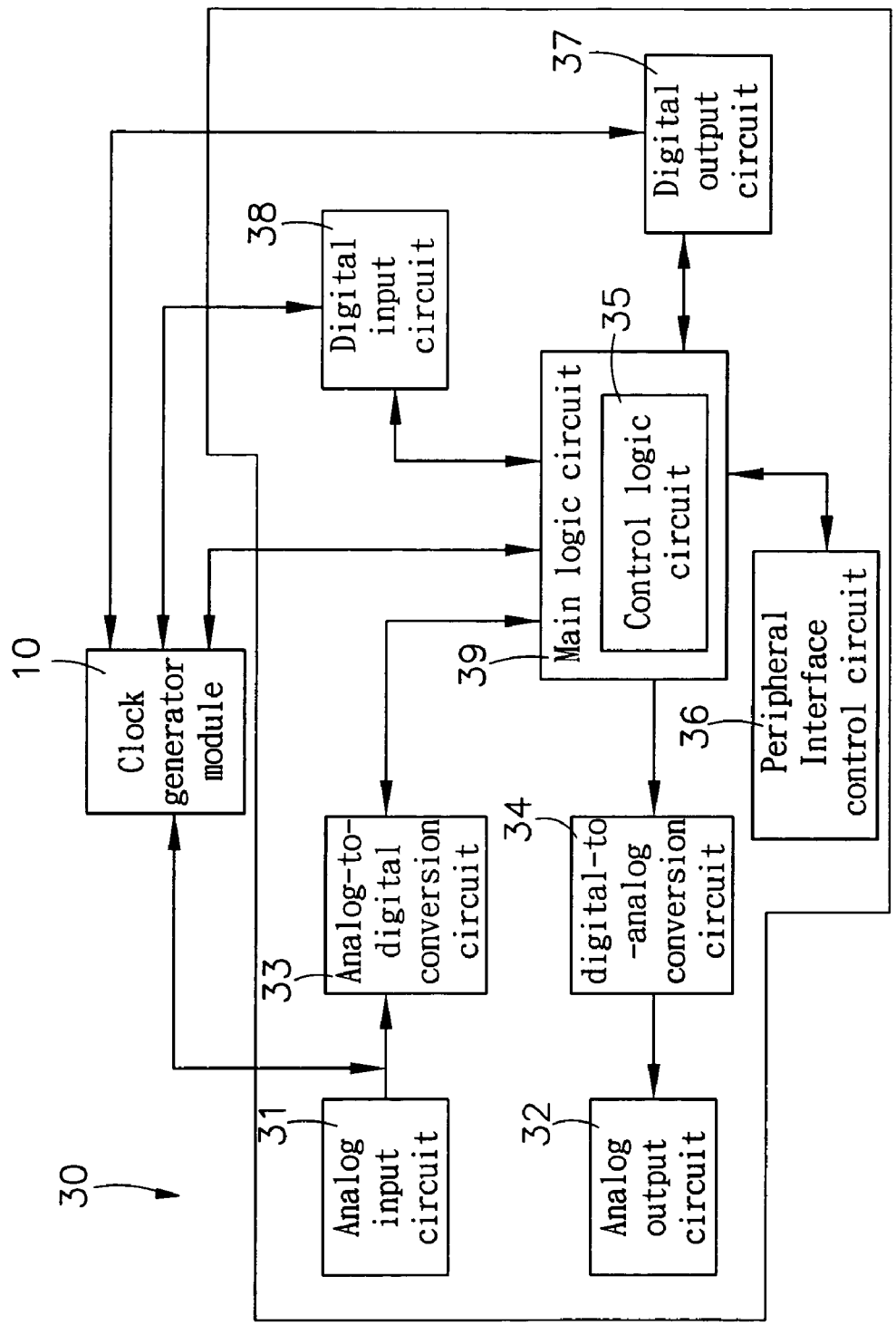
FIG. 4 is the flowchart showing the application of the clock generator module of the present invention in a measuring equipment.

Referring to FIG. 4, show a flowchart illustrating the application of the clock generator module of the present invention in a measuring equipment. When processing measuring, data acquisition or transmission, the control logic circuit 35 of the main logic circuit 39 accepts the command transmitted by the peripheral interface control circuit 36 to setup the required frequency for the clock generator module 10 to provide to four major functional circuits, including the analog input function, analog output function, digital input function and digital output function. For the analog input function, the clock enables the analog-to-digital conversion circuit 33 to convert the analog signal into the digital signal and transmit it to the main logic circuit 39 for further processing or transmitting out through the peripheral interface control circuit 36. Similar to the analog input, the digital input circuit 38 is based on the clock from the clock generator module 10 to output the received digital signal to the main logic circuit 39. Vice versa, the analog output and digital output functions are also based on the clock from the clock generator module 10 to output the signal by the digital output circuit 37 or digital-to-analog conversion circuit 34.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A clock generator module, electrically connected with a mainboard through a connector for communicating with each other, wherein
    an interface definition of the clock generator communicates with a control logic circuit of the mainboard to generate a required clock frequency; wherein
    said interface definition comprises identification signals, interface control signals; a reference clock input signal, a clock output signal and power supply; and wherein
    different clock generator modules use different digital levels of said identification signals to differentiate functions;
    said interface control signals are for setting up various clock modules;
    said reference clock input signal selectively receives a clock reference input from a selected reference clock source;
    said clock output signal outputs the reguired clock signal to said mainboard, and said main board provides power supply to said clock generator module.

2. The clock generator module according to claim 1, wherein said identification signals identify a required clock type to said clock generator module.

3. The clock generator module according to claim 2, wherein said identification signals function are in a three-bit identification mode.

4. The clock generator module according to claim 1, wherein said interface control signals use ten signals for setting up various clock generator modules.

5. The clock generator module according to claim 1, wherein said interface control signals are generated by said control logic circuit according to retrieved identification signals.

6. The clock generator module according to claim 1, wherein said mainboard is integrated into stand-alone equipment.

7. The clock generator module according to claim 1, wherein said mainboard is integrated in a modular platform or equipment.

8. The clock generator module according to claim 1, wherein said mainboard is integrated into a data-acquisition electronic product.

9. The clock generator module according to claim 1, wherein said mainboard is integrated into an electronic product comprising data-acquisition function.

* * * * *